United States Patent
Michaelis

(10) Patent No.: US 6,582,213 B2
(45) Date of Patent: Jun. 24, 2003

(54) TOOL FOR PRODUCING A FILTER CARTRIDGE

(75) Inventor: Udo Michaelis, Alsbach-Hähnlein (DE)

(73) Assignee: Firma Carl Freudenberg, Weinheim (DE)

( * ) Notice: Subject to any disclaimer, the term of this patent is extended or adjusted under 35 U.S.C. 154(b) by 221 days.

(21) Appl. No.: 09/728,234

(22) Filed: Dec. 1, 2000

(65) Prior Publication Data
US 2001/0013670 A1 Aug. 16, 2001

(30) Foreign Application Priority Data
Dec. 3, 1999 (DE) ......................... 199 58 344

(51) Int. Cl.[7] ................ B29C 45/14; B29C 70/76
(52) U.S. Cl. ................ 425/125; 249/95; 264/252; 264/DIG. 48; 425/128
(58) Field of Search ................ 425/117, 125, 425/128; 264/252, DIG. 48; 249/95

(56) References Cited

U.S. PATENT DOCUMENTS

| 3,183,286 A | * | 5/1965 | Harms | 264/DIG. 48 |
| 4,347,208 A | * | 8/1982 | Southall | 264/DIG. 48 |
| 4,569,813 A | * | 2/1986 | Taki et al. | 264/DIG. 48 |
| 4,746,339 A | * | 5/1988 | Millard | 425/117 |
| 6,416,570 B2 | * | 7/2002 | Goto et al. | 264/DIG. 48 |

FOREIGN PATENT DOCUMENTS

| DE | G 88 08 632 U1 | 10/1988 | |
| DE | 40 02 078 C1 | 5/1991 | |
| DE | 43 23 522 A1 | 1/1995 | |
| DE | 40 39 288 C2 | 9/1997 | |
| DE | 197 36 267 C1 | 12/1998 | |
| EP | 0523986 A1 | * 1/1993 | |
| JP | 10263348 A | * 10/1998 | B01D/46/52 |
| JP | 11090150 A | * 4/1999 | B01D/46/52 |

* cited by examiner

Primary Examiner—Robert Davis
(74) Attorney, Agent, or Firm—Kenyon & Kenyon

(57) ABSTRACT

The bellows (6) of a filter cartridge is inserted into an injection-molding die (3) and provided with the plastic frame (24) by an injection-molding process. The surfaces of the die (3) that lie opposite one another are provided, at least at their edge surfaces (15), with sawtooth-like profiles (1, 2; 30, 31). The sawtooth-like profiles engage with one another and hold the individual folds (22, 23; 35, 36) of the bellows (6) in a defined position relative to one another. The bellows (6) is held by the profiles (1, 2; 30, 31) at its face edges (19) over a narrow region (18), and pressed together, forming a seal, for the injection-molding process.

5 Claims, 6 Drawing Sheets

TOOL FOR PRODUCING A FILTER CARTRIDGE

FIELD OF INVENTION

The present invention relates to a process for producing a filter cartridge with bellows and a plastic frame, and to a tool for implementing the process.

BACKGROUND INFORMATION

Filter cartridges are used, in particular, as gas filters or also as air filters for the passenger space of motor vehicles. They are known in various embodiments and are very frequently provided with a frame, in order to have suitable mechanical strength. For example, a filter cartridge is known from German published patent application 43 23 522. That application discloses a filter cartridge with bellows made of a filter strip material which is folded in a zigzag shape. The bellows is set into a frame that is formed of U-shaped strips, and surrounds the filter bag on all sides, forming a seal. The strips are connected with the filter strip material by bonding. The production of such a filter cartridge is relatively complicated.

Another possibility for the production of a filter insert is shown by German Patent 40 02 078. There, the outside edges of a filter bag are held by comb-like profiles. A material that projects laterally beyond the comb-like profiles is placed around them using contact pressure elements, and the materials are pressed together and fixed in place. However, such a filter does not always have the desired rigidity.

From German Patent 40 39 288, a filter insert is known, where the edge seal is achieved by a closure on the face, with a sealing material that covers it. The sealing material can be a strip that is glued or bonded onto the faces of the bellows. The filter strip material is made of a material that can melt, and its face surfaces are partially melted and compressed in order to achieve an enlarged face surface. For the melting and compression process, the bellows is held in a clamping device. This process is also quite complicated in production. German utility model G 88 08 632 deals with an air filter insert with a frame made of plastic that is cast on, which covers only a small part of the filter body. Here, the flow conditions are unclear, since the air to be filtered is not entirely passed through the filter surface. In addition, the plastic gets into the interstices between folds during the casting process, and takes away some of the filter surface.

Finally, it is also known from German Patent 197 36 267 to form a filter insert that is surrounded on all sides by a frame made of plastic that is injection-molded onto the insert. Here again, there is the problem that plastic can penetrate too far into the interstices between folds.

SUMMARY OF THE INVENTION

The invention is based on the object of creating a process for the production of a filter cartridge, and a tool for implementing the process, that are easy to use and where the filter cartridge, with the bellows and the plastic frame, are made in one piece. The cartridge should have as much rigidity as possible, and should be inexpensive to produce.

The object is achieved by the process according to the present invention. A bellows is formed in a known manner from a flat strip of non-woven material, such as paper, or the like. The bellows has the approximate shape of the filter cartridge that it will form. This can be a rectangle or any other geometric shape. The pre-formed bellows is inserted into an injection-molding die and the plastic frame is injection-molded around it, using the injection-molding process. The injection-molding die has a frame shape where the surfaces that lie opposite one another are provided with sawtooth-like profiles. The sawtooth-like profiles engage with one another when the die is closed and hold the individual folds of the bellows in a defined position relative to one another. At edge surfaces of the sawtooth-like profiles, the profiles are structured in such a way that when the die is closed, the bellows is held at its face edges over a narrow region, and pressed together, forming a seal for the injection-molding process. In this connection, the face surfaces of the profiles and the face edges of the bellows are used as an end wall of the frame shape of the injection-molding die.

As the tool for implementing the process, an injection-molding die is used. The injection-molding die has a frame shape that has a bottom die and an upper die. The surfaces of the injection-molding die have sawtooth-like profiles that engage into one another to hold the individual folds of the bellows in a defined position. When the die mold is open, the prefinished bellows are set onto one of the surfaces, with the profiles engaging in the folds. As the die is closed, the profiles of the other cover surface engage in the remaining folds on the other side of the bellows. The profiles are structured in such a way that they form a gap relative to one another, over a small region of the face edges of the bellows, when the die is closed. The gap allows the face edges of the bellows to be securely held, pressed together, and sealed. Using such a tool, the bellows can be provided with a frame all around, using the injection-molding process. This frame securely holds the bellows and results in a definite seal between the bellows and the frame.

In order to be able to hold the bellows securely, it is possible that the profiles have stepped reinforcements at their ends. The surfaces of the stepped reinforcements lie parallel to the surfaces of the rails, and hold the face edge region of the bellows and press it together. The width of the rail reinforcement is selected in such a way that the region of the face edges of the bellows that is covered by the reinforcement is as small as possible.

A particularly advantageous shape of the profiles is achieved if they are provided at their flanks with cleared areas that do not cover their ends. This structure allows a continuous top edge of the profiles, avoiding any steps in the vicinity of the pressing region. The face edges of the bellows are pressed together in the region of the face edges, without any sharp transitions between the interacting ends of the profiles. This embodiment furthermore has the advantage of particularly simple production, since the cleared areas that must be machined into the flanks can be formed from surfaces that stand at a right angle to one another. This geometry of the cleared areas allows the use of standard tools to machine the cleared areas.

BRIEF DESCRIPTION OF THE DRAWINGS

The invention will be explained in greater detail below on the basis of two exemplary embodiments shown in the drawings.

DETAILED DESCRIPTION OF THE INVENTION

Figure 1:
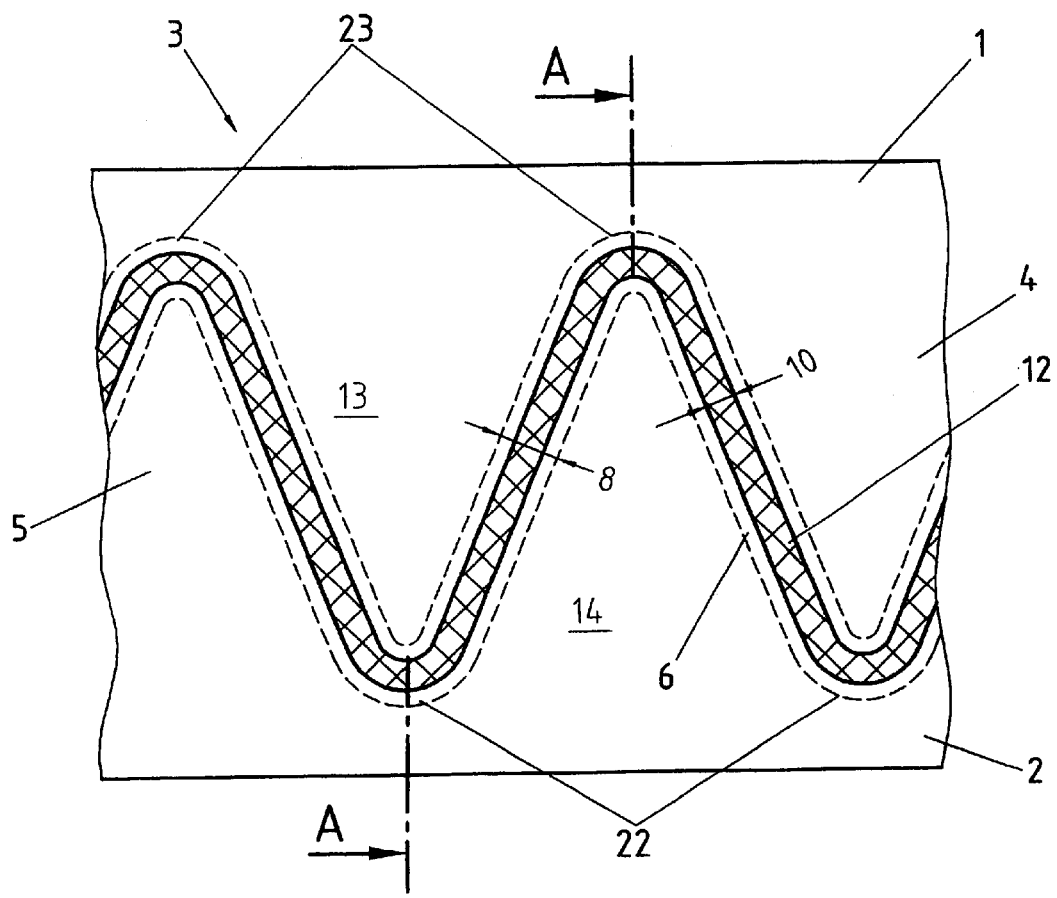
FIG. 1 shows a side view of an edge section of the die profile.

The fundamental structure of a die with sawtooth-like profiles for the production of filter inserts is actually known, as is evident, for example, from German Patent 40 39 288 or also German Patent 40 02 078, which are hereby incorporated by reference in their entirety. Furthermore, filter configurations can be very varied in their geometric shape. Because of this known state of the art for injection-molding a frame in an injection-molding die, the the drawing only shows those parts of the tool that are essential for implementing the process.

FIG. 1 shows a side view of a section of sawtooth-like profiles 1 and 2 of a die 3 that engage with one another. The injection-molding die, shown schematically, is provided with profiles 1 and 2 with sawteeth 4 and 5 on its opposite surfaces. The profiles 1 and 2 correspond to the shape of a bellows 6. The bellows 6, with a pre-formed shape, is held by the saw-toothed profiles 1 and 2. As is also made clear by FIGS. 2 and 3, the saw-toothed profiles 1 and 2 are structured in such a way that they not only hold the bellows 6 in position, at its edge region 15, with regard to its geometrical folds, but also press it together at the edge regions 15. In FIG. 1, the bellows 6 is drawn with a broken line in its non-compressed part 16, which has a thickness 8. At its edges 15, however, the bellows 6 is pressed together to a thickness 10. This causes the bellows 6 to be securely held in the die, and a lateral surface 11 of the profiles 1 and 2, together with a face surface 12 of the compressed bellows 6, result in a closed surface for the injection-molding process. The injection-molding mass cannot penetrate into the interstices 13, 14 between the individual folds.

Figure 2:
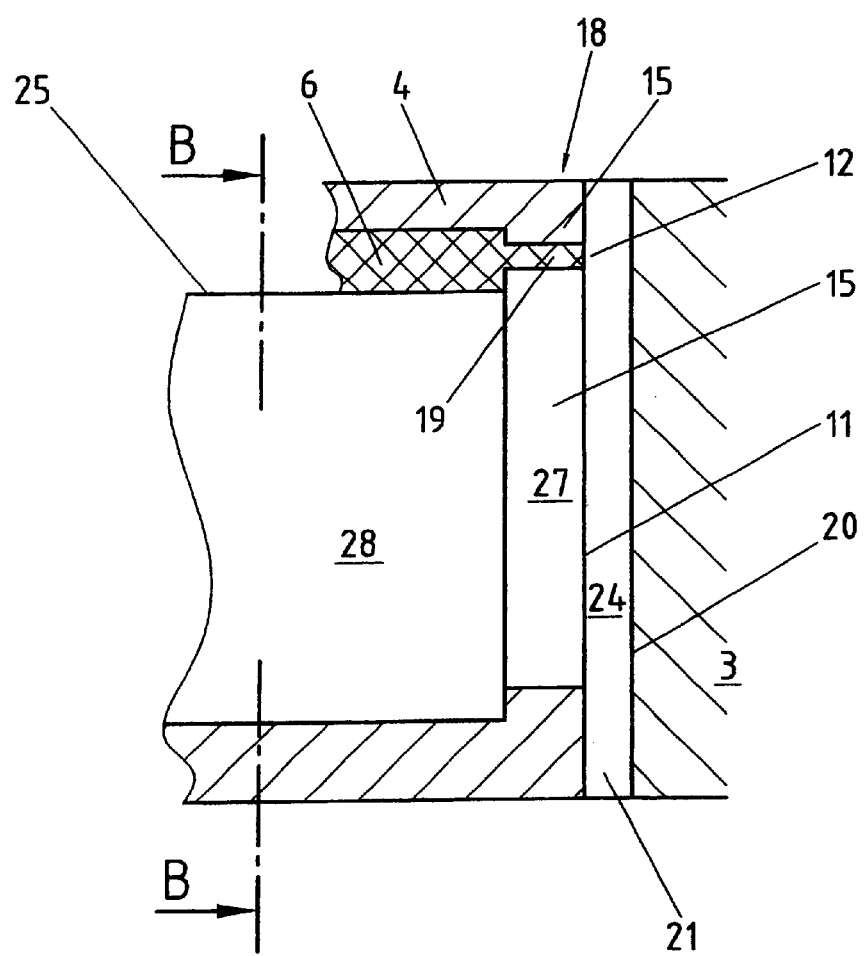
FIG. 2 shows a cross-section through the profile along line A—A of FIG. 1.

FIG. 2 shows a cross-section along line A—A of FIG. 1. A stepped edge 15 of sawtooth 5, which projects laterally beyond a sawtooth 5, is clearly visible. In the top part of the figure, the position of the bellows 6 between the teeth 4 and 5 can be seen. In a narrow edge region 18 of the bellows 6, its face edges 19 are held and pressed together by the edge surfaces 15 of the profiles 1 and 2. When the die 3 is closed, a gap 21 exists between the side surface 11 of the profiles 1 and 2 as well as the face surface 12 of the bellows 6 and the inside wall 20 of the die 3. The space 21 can be filled with an injection-molding mass to form a frame 24 for the bellows 6.

Figure 3:
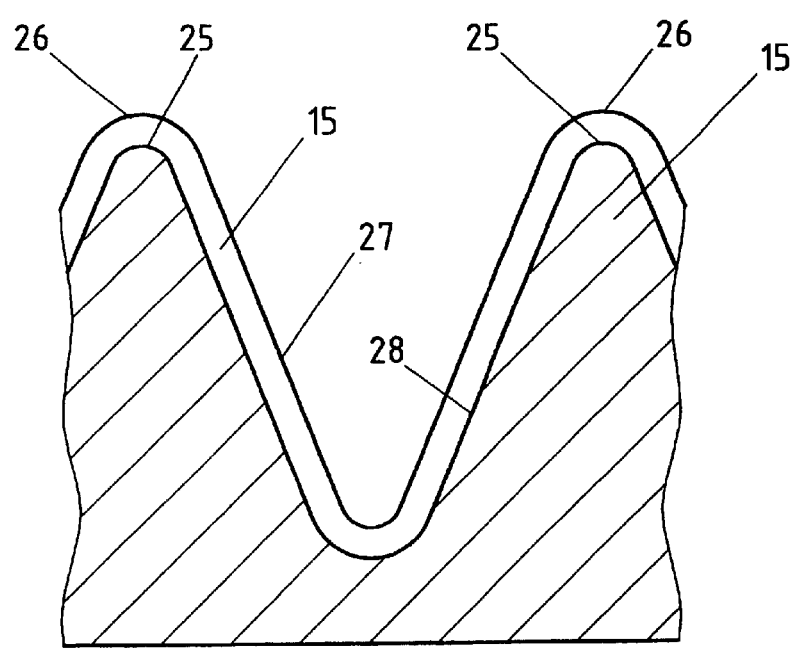
FIG. 3 shows a cross-section along line B—B in FIG. 2.

FIG. 3 shows a cross-section through the sawtooth-like profile 5 of FIG. 2, along line B—B. The stepped edge 15 can be seen. When the profiles 1 and 2 are joined together, as shown in FIG. 1, the profiles 1 and 2 get into the interstices 13, 14 of individual folds 22, 23 and thereby hold the folds in the desired position. However, the edges 15 of the profiles 1 and 2 project forward and hold the face edges of the bellows 6 over a narrow region, thereby pressing it together. FIG. 2 illustrates the position of the bellows 6 between profiles 1 and 2. In FIG. 3, for the sake of simplicity, the bellows 6 has not been shown. FIG. 2 also shows the inside wall 20 of the injection-molding die 3. The gap 21 that is formed between the side wall 11 formed by the profiles 1 and 2 and the inside wall 20 of the injection-molding die 3 is filled with plastic mass during the injection-molding process, and represents the frame 24 for the filter cartridge.

Combs 25 of the sawteeth 4 and 5 lie below comb lines 26 of the edge regions 15. Surfaces 27 of the edge surfaces 15 lie parallel to surfaces 28 of the sawteeth 4 or 5.

Figure 4:
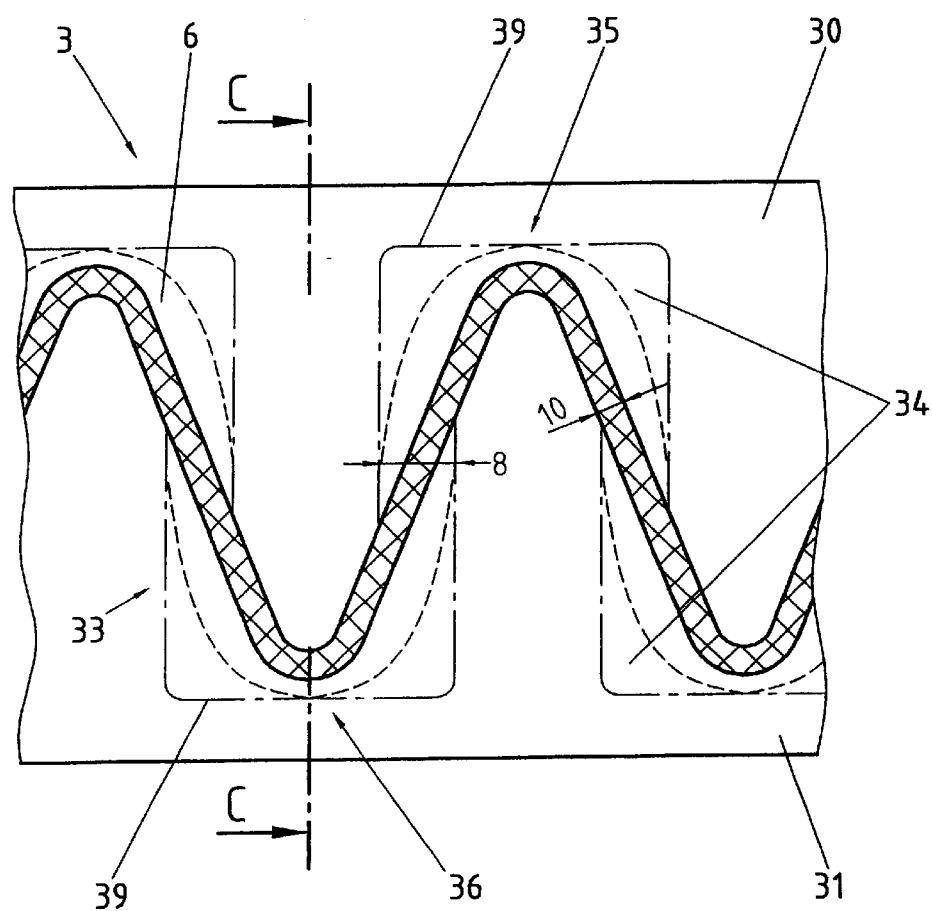
FIG. 4 shows an embodiment with cleared areas at the profile flanks.
Figure 5:
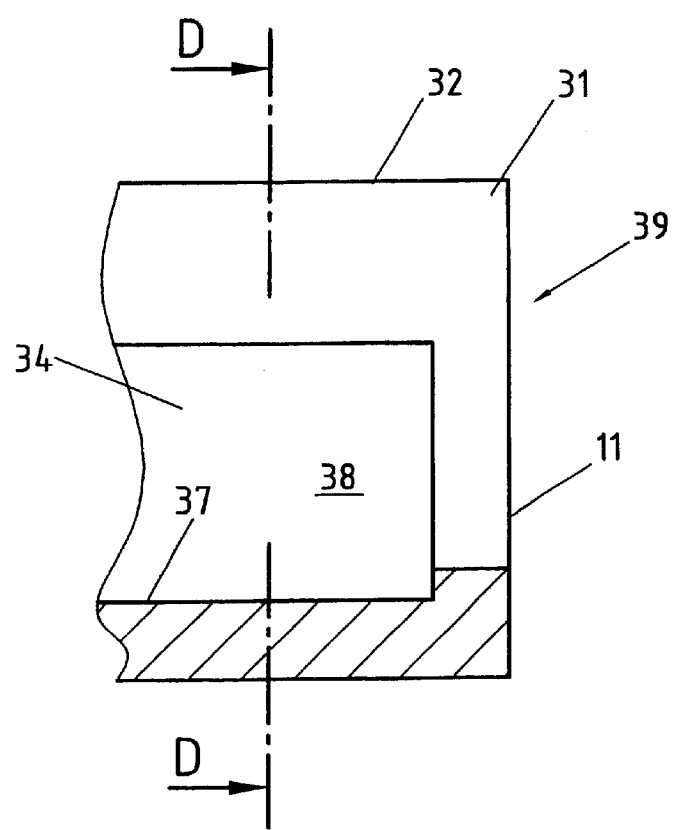
FIG. 5 shows a cross-section along line C—C in FIG. 4.
Figure 6:
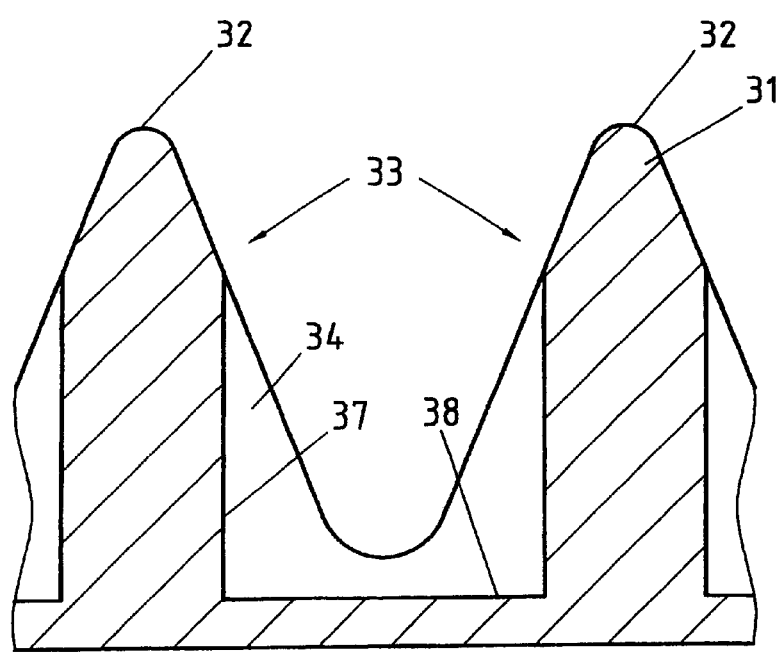
FIG. 6 shows a cross-section along line D—D in FIG. 5.

FIGS. 4 to 6 show the preferred embodiment for implementing the process. The fundamental structure of the injection-molding die 3, is made up of sawtooth-like profiles 30, 31 and is the same as in FIGS. 1 to 3. However, the face edge region 18 of the bellows 6 is not held in place by the projecting edges 15 at the sawteeth 4 and 5. Instead, the profiles 30, 31 are provided with continuous combs 32 of equal height. At their flanks 33 cleared areas 34 are provided. With these type of profiles 30, 31, a secure position of the individual folds 35, 36 of the bellows 6 relative to one another is ensured, and the face edges 19 of the bellows 6 can be securely held and compressed for the injection-molding process. However, the cleared areas 34 at the flanks 33 allow the bellows 6 to move out of the way as profiles 30, 31 are joined together, so that the bellows 6 is compressed only in a narrow region 18 of the face edges 19. In order to make it possible for the bellows 6 to move out of the way, the flanks 33 are equipped with a correspondingly deep cleared area 34. However, it is advantageous if, as shown in FIGS. 4 and 6, the cleared areas 34 have surfaces 37, 38 that stand at a right angle to one another. This makes it possible to use simple tools to form the cleared areas 34. FIG. 4 shows the compressed, visible face surface 12 of the bellows 6 with cross-hatching. The non-compressed part of the bellows 6 is indicated with a broken line. The cleared areas 34 are marked with a dot-dash line 39.

FIG. 5 shows a cross-section along line C—C of FIG. 4, omitting the top profile 30. Only the bottom profile 31 is shown. The bottom profile 31 has a comb 32 of equal height and is provided at its flanks 33 with a cleared area 34, where a narrow region at the ends of the profile 31 is not covered by the cleared area 34. This region serves to compress the face edges 19 of the bellows 6.

FIG. 6 again shows the structure of the profile 31 in cross-section, and the shape of the preferred cleared area 34 can be seen.

What is claimed is:

1. A tool for producing a filter cartridge having a bellows and a plastic frame, comprising an injection-molding die with a frame shape that has a bottom die with a central surface and an edge surface and an upper die with a central surface and an edge surface, said edge surfaces having sawtooth profiles that engage into one another to hold individual folds of the bellows in the region of its face edges in a defined position, the edge surfaces standing at a distance from one another when the die is closed, thereby forming a first gap, said first gap allowing the face edges of the bellows to be securely held, pressed together, and sealed, and said central surfaces having sawtooth profiles that hold individual folds of the bellows in a defined area, the central surfaces standing at a distance from one another when the die is closed, thereby forming a second gap having a width greater than the width of the first gap.

2. A tool for producing a filter cartridge having a bellows and a plastic frame, comprising an injection-molding die with a frame shape that has a bottom die with a surface and an upper die with a surface, said surfaces having sawtooth profiles that engage into one another to hold individual folds of the bellows in a defined position, said sawtooth profiles standing at a distance from one another in the region of face edges of the bellows when the die closed, thereby forming a gap, said gap allowing the face edges of the bellows to be securely held, pressed together, and sealed, wherein the profiles have edge surfaces that project beyond the contour of the sawtooth profiles at the sawtooth profiles lateral ends, the surfaces of which lie parallel to the surfaces of the profiles, so that the edge surfaces compress the face edge region of the bellows.

3. A tool for producing a filter cartridge having a bellows and a plastic frame, comprising an injection-molding die with a frame shape that has a bottom die with a surface and an upper die with a surface, said surfaces having sawtooth profiles that engage into one another to hold individual folds of the bellows in a defined position, said sawtooth profiles standing at a distance from one another in the region of face edges of the bellows when the die is closed, thereby forming a gap, said gap allowing the face edges of the bellows to be securely held, pressed together, and sealed, wherein the sawtooth profiles each have a comb of equal height, and are provided with flanks with cleared areas, where the lateral ends of the flanks are not covered by the cleared areas.

4. The tool according to claim 3, wherein the cleared areas have surfaces that stand at a right angle relative to one another.

5. The tool according to claim 1, wherein the edge surfaces lie parallel to the central surfaces.

* * * * *